April 18, 1967 W. A. CARTER 3,315,130
CURRENT-SENSING CIRCUIT
Filed April 13, 1965
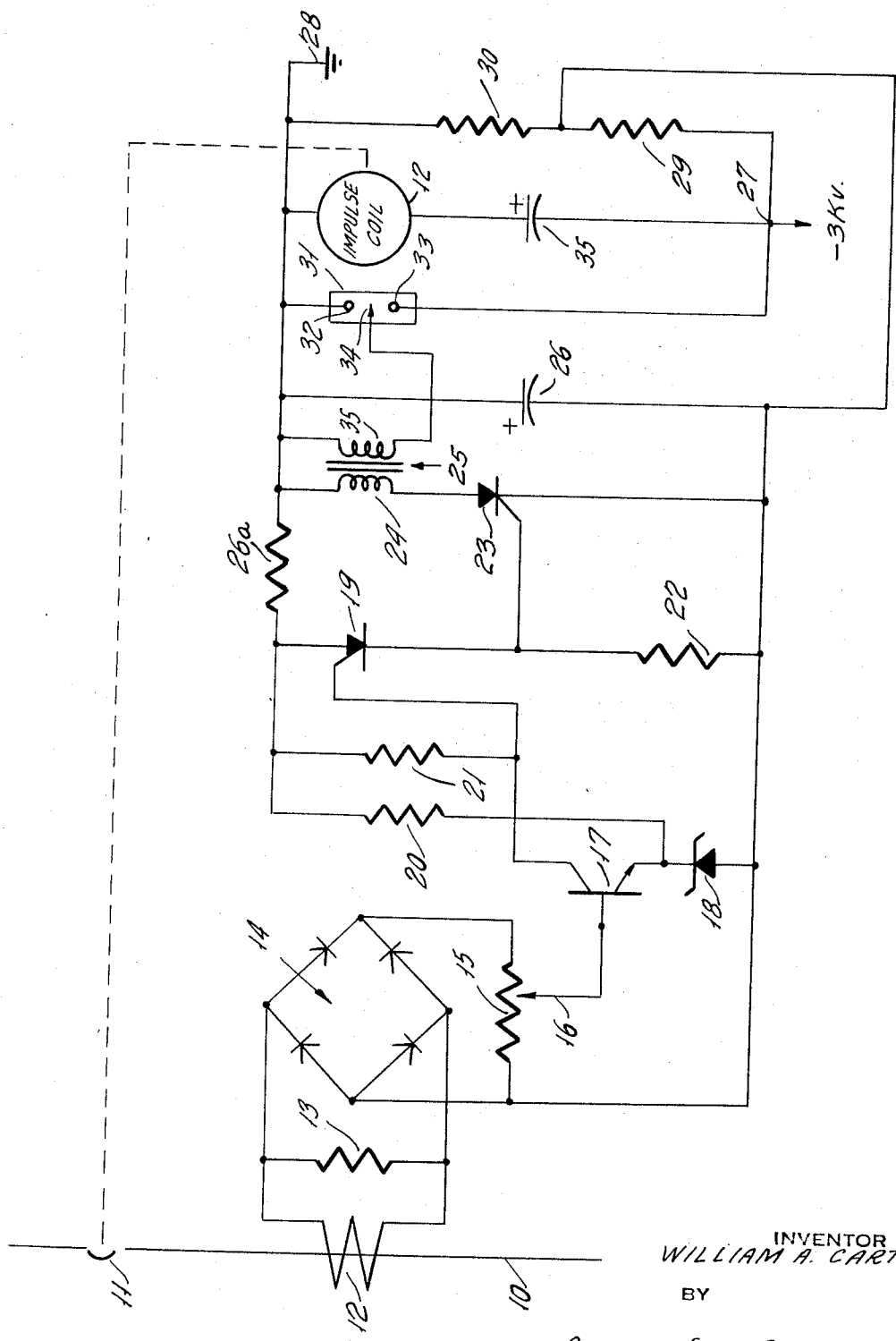
INVENTOR
WILLIAM A. CARTER
BY
OSTROLENK, FABER, GERB & SOFFEN
ATTORNEYS

United States Patent Office 3,315,130
Patented Apr. 18, 1967

3,315,130
CURRENT-SENSING CIRCUIT
William A. Carter, Devon, Pa., assignor to I-T-E Circuit Breaker Company, Philadelphia, Pa., a corporation of Pennsylvania
Filed Apr. 13, 1965, Ser. No. 447,636
4 Claims. (Cl. 317—33)

This invention relates to a novel current-sensing circuit having no moving parts which operates in the manner of a relay having zero time delay, and more particularly relates to a novel current-sensing circuit which is responsive to current magnitude as contrasted to rate of change of current for operating the tripping or driving coil of protective circuit devices.

Current-sensing devices are generally well known to the art, and used, for example, for the operation of circuit protective devices, and which generate tripping signals for circuit protective devices when the current in the circuit being protected is subjected to fault conditions. Such devices typically operate responsive to rate of change of current in the circuit being protected, and give rise to time delays between the time that fault conditions occur and the time that an operating impulse is delivered to the circuit interrupter operating system.

The principle of the present invention is to provide a novel control circuit which responds to actual current magnitude as contrasted to rate of change of current whereby an output operating signal is delivered when current magnitude exceeds some predetermined value.

Accordingly, a primary object of this invention is to provide a fault-sensing system for ultra high speed protective devices.

Another object of this invention is to provide a novel protective circuit for generating an output signal to an interrupter-type device responsive to a fault in the circuit being protected without any time delay.

Another object of this invention is to provide a novel static protective circuit having the characteristics of a relay.

Still a further object of this invention is to provide a novel signal generating circuit which is responsive to fault conditions in a major circuit and which is responsive to current magnitude in the major circuit as contrasted to rate of change in the major circuit.

These and other objects of this invention become apparent from the drawing which shows a circuit diagram of the present invention for driving the impulse coil of an ultra high speed circuit interrupter device.

Referring now to the drawing, I have illustrated therein a novel control circuit which has a minimum of components, yet maintaining extremely high reliability for the fault-sensing device.

The drawing schematically illustrates a main conductor 10 which is a portion of a major circuit to be protected by the operation of the contacts of an ultra high speed circuit interrupter 11 connected in series in the line. The circuit interrupter 11 is of the type described in U.S. Patent 2,916,579 wherein the contacts thereof are operated responsive to the energization of an impulse coil schematically illustrated by the labeled circle 12 connected to the contacts 11 by the dotted line in the drawing. As will be seen more fully hereinafter, however, the impulse coil 12 could be replaced by any other electrically energizable component which is to be energized responsive to the occurrence of predetermined current magnitudes in the line 10.

A current transformer 12 is suitably connected to the line 10, and the secondary thereof is loaded with a low ohmic resistance burden comprising the resistor 13. The voltage appearing across resistor 13 need not be large, and may be less than 100 volts. Thus, the current transformer can be made small without sacrificing accuracy. Moreover, the resistor 13 is preferably non-inductive so that the voltage appearing across its terminals will be a replica of the current in the primary conductor 10.

The terminals of resistor 13 are then connected to the A.-C. terminals of the single phase bridge connected rectifier 14 which removes any subsequent circuit complications which might result due to the A.-C. output characteristic of the current transformer. The output of bridge 14 is then connected across a 24K potentiometer 15 whose wiper arm 15 is connected to the base electrode of transistor 17 which can be of the type 2N697.

The base emitter circuit of transistor 17 is then connected in series with a 20 volt zener diode 18 whereby the zener diode 18 will prevent conduction in the base emitter circuit of transistor 17 until the voltage drop across the left-hand side of potentiometer 15 exceeds the accurately calibrated value of 20 volts of the zener diode 18. Note that other voltage values could be used for the zener diode, depending upon the desired application of the circuit.

The transistor 17 is then coupled to a second transistor 19 which may be of the type 3N83 through the 27K resistor 20 and the 5.1K resistor 21. The output circuit of the transistor 19 is then connected through the 1K resistor 22 to the bottom of zener diode 18, while a second output circuit is connected in closed series relation with the gate electrode of controlled rectifier 23, the primary winding 24 of a pulse transformer 25, and a 3K resistor 26a. The controlled rectifier 23 may be of the type 2N1774.

The primary winding 24 is further connected in closed series relation with a 0.1 microfarad capacitor 26 and the anode-cathode circuit of controlled rectifier 23. An auxiliary D.-C. source having a voltage of 3,000 volts then has its negative terminal connected to terminal point 27 and its positive terminal connected to ground 28. This high D.-C. voltage source is connected across the voltage divider circuit which includes the 0.6 megohm resistor 29 and 10K resistor 30 with the voltage across resistor 30 being connected in parallel with capacitor 26.

A spark gap 31 is then provided which has main electrodes 32 and 33 and a trigger electrode 34.

The primary winding 35 of pulse transformer 25 is then connected across the trigger electrode 34 and electrode 32, whereupon a voltage across trigger electrode 34 and main electrode 32 will cause a small spark which will initiate the firing of the main electrodes 32 and 33. The electrodes 32 and 33 are then connected in series with impulse coil 12 and a 40-microfarad capacitor 35. Thus, when the spark gap 31 operates, the capacitor 35 will discharge through impulse coil 12, thereby to operate contacts 11.

The circuit operates in the following manner:

The main current flowing through the main bus or conductor 10 will produce a fractional voltage across the pre-calibrated potentiometer 15 through the current transformer 12 and rectifier 14. When this voltage which is proportional to current magnitude in conductor 10 exceeds the voltage drop across the zener diode 18, the transistor 17 conducts, resulting in conduction of transistor 19. This conduction will then change the voltage on the gate of controlled rectifier 23, thus firing the controlled rectifier 23 and permitting the discharge of capacitor 26 through the primary winding 24 of pulse transformer 25. The discharge of capacitor 26 produces a high voltage pulse on primary winding 24, which high voltage pulse is transformed into the secondary winding 35 of pulse transformer 25. The high voltage pulse across winding 35 is then applied to the trigger electrode 34, thereby causing a breakdown of the gap between main electrodes 32 and 33.

Thus, the spark gap 31 acts as a switch which connects the large capacitor 35 which is charged from the high voltage source, through the impulse coil 12, thereby providing the large energy required to initiate the protective operation caused by impulse coil 12 and its associated components 11, as described in U.S. Patent 2,916,579.

Note that spark gaps such as spark gap 31 require a voltage pulse of considerable magnitude in order to be fired reliably. The pulse transformer 25 will produce a high frequency pulse of several kilovolts with only a slight delay in the order of 10 to 50 microseconds. This pulse is capable of consistently firing spark gap 31, thereby discharging capacitor 35 into the impulse coil 12 without resorting to a mechanical switching device which would be very slow.

Accordingly, the contacts 11 will be operated without any substantial time delay after the measurement of a current magnitude in conductor 10 which exceeds some predetermined value. Note that the circuit operation is wholly independent of rate of change of current.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A current-sensing circuit for energizing a load device responsive to a predetermined current in a conductor; said current-sensing circuit including a pulse transformer having a primary and secondary winding, a first and second capacitor, a controlled rectifier, a spark gap having first and second spaced main electrodes and a trigger electrode, voltage source means connected across said first and second capacitors to charge said capacitors, first circuit means connected to said conductor having an output D.-C. voltage proportional to the instantaneous current magnitude of said conductor, and second circuit means including a zener diode; said first circuit means connected to said second circuit means with its said output D.-C. voltage reverse biasing said zener diode of said second circuit means; said second circuit means connected to the gate electrode of said controlled rectifier and firing said controlled rectifier response to reverse conduction of said zener diode; said first capacitor connected in series with the cathode-anode electrodes of said controlled rectifier and said primary winding of said pulse transformer; said secondary winding connected in series with said trigger electrode and one of said main electrodes of said spark gap; said second capacitor connected in series with said main electrodes of said spark gap and said load, whereby when said current in said conductor exceeds a predetermined current, said zener diode becomes conductive to fire said controlled rectifier, thereby discharging said first capacitor through said secondary winding to cause said spark gap to fire, thereby to discharge said second capacitor through said load device.

2. The device substantially as set forth in claim 1 wherein said first circuit includes a current transformer connected to said conductor and a rectifier having A.-C. and D.-C. terminals; said current transformer having a secondary winding connected to said A.-C. terminals of said rectifier; said D.-C. terminals of said rectifier connected to said zener diode.

3. The device substantially as set forth in claim 2 wherein said first circuit includes a current transformer connected to said conductor, a rectifier having A.-C. and D.-C. terminals, and a transistor having base, emitter and collector terminals; said current transformer having a secondary winding; said secondary winding connected to said A.-C. terminals, said D.-C. terminals connected in series with said zener diode and said base and emitter electrodes; said emitter and collector electrodes connected to said second circuit means.

4. The device substantially as set forth in claim 1, wherein said conductor is connected in series with circuit breaker contact means; said load device connected to said circuit breaker contact means to operate said circuit breaker contact means to a deenergized position responsive to energization of said load device by discharge of said second capacitor therethrough.

References Cited by the Examiner

UNITED STATES PATENTS

| | | | |
|---|---|---|---|
| 2,840,766 | 6/1958 | Wouk | 317—16 |
| 3,262,017 | 7/1966 | Ashenden et al. | 317—33 |
| 3,275,891 | 9/1966 | Swanson | 317—16 |

MILTON O. HIRSHFIELD, *Primary Examiner.*

J. D. TRAMMELL, *Assistant Examiner.*